United States Patent [19]
Jensen et al.

[11] Patent Number: 5,598,929
[45] Date of Patent: Feb. 4, 1997

[54] TWO-PART CONTAINER

[75] Inventors: Maren Jensen; Jeanine Lobell, both of Los Angeles, Calif.; Lou Stevens, Cleveland, Ohio

[73] Assignee: The Make-Up Group, Inc., Los Angeles, Calif.

[21] Appl. No.: 341,425

[22] Filed: Nov. 17, 1994

[51] Int. Cl.⁶ ................................................. B65D 75/00
[52] U.S. Cl. .................. 206/527; 132/293; 206/581; 206/823
[58] Field of Search ...................... 132/293, 294; 206/229, 527, 581, 823

[56] References Cited

U.S. PATENT DOCUMENTS

| | | | |
|---|---|---|---|
| 1,535,522 | 4/1925 | Dolan | 206/823 |
| 1,735,853 | 11/1929 | Dreux | 206/823 |
| 1,794,301 | 2/1931 | Kendall | 132/293 |
| 2,036,928 | 4/1936 | Dreux et al. | 206/823 |
| 4,337,859 | 7/1982 | Murphy et al. | 132/294 |

*Primary Examiner*—Jimmy G. Foster
*Attorney, Agent, or Firm*—Jeanine M. Pisoni

[57] ABSTRACT

A container for a substantially solid product such as a cosmetic product includes a base and a lid. The base defines a shape for the product and has open ends which include interior rims for sandwiching an end panel and a cosmetic product between them. The lid includes an interior rim at one end. An end panel frictionally fits with the rim. The container is formed of a bio-degradable material.

1 Claim, 1 Drawing Sheet

TWO-PART CONTAINER

BACKGROUND

This invention relates to a container. In particular, it relates to a container for cosmetic products.

Many different containers for different products are known. In the area of containers for cosmetics, these containers are invariably formed of plastic, metal and/or glass. These containers are relatively expensive to fabricate, at least in the costs of establishing the initial fabrication dyes and molds. Moreover, the containers are not environmentally optimum.

There is a need to provide a container for products, particularly cosmetic products, which is environmentally benign, namely is formed of bio-degradable products, and which is relatively inexpensive to produce.

SUMMARY

By this invention, there is provided a container for a substantially solid product, particularly a cosmetic product, which minimizes the disadvantages of known containers.

According to the invention, a container for a substantially solid product comprises a base having a chosen peripheral side wall shape about a space for confining a substantially solid product. The base has open end walls, side wall interior rims at each end of the base and an end panel of a selected thickness disposed adjacent to and transverse to an interior room of the base. The substantially solid product is disposed between another interior rim of the base and the end panel.

A lid includes a peripheral side wall conforming to and slightly larger than the base for enclosing the base with a sliding frictional fit. The lid has open ends and a side wall interior rim at one end of the lid. An end panel is disposed adjacent to the interior rim and transverse to the interior rim. The lid is for covering the base.

The container is made of bio-degradable material which is substantially non-deformable and rigid as assembled.

The peripheral side wall ends are at least partly inwardly directed to form the interior rims. The peripheral dimensions of the substantially solid product are selected such that the product is frictionally maintained between and transverse to the interior rim and end panel of the base. The end panel of the base and the end panel of the lid are literally separate elements for location adjacent to the inwardly directed interior rims.

The invention is further described with reference to the accompany drawings.

DRAWINGS

DESCRIPTION

Figure 1:
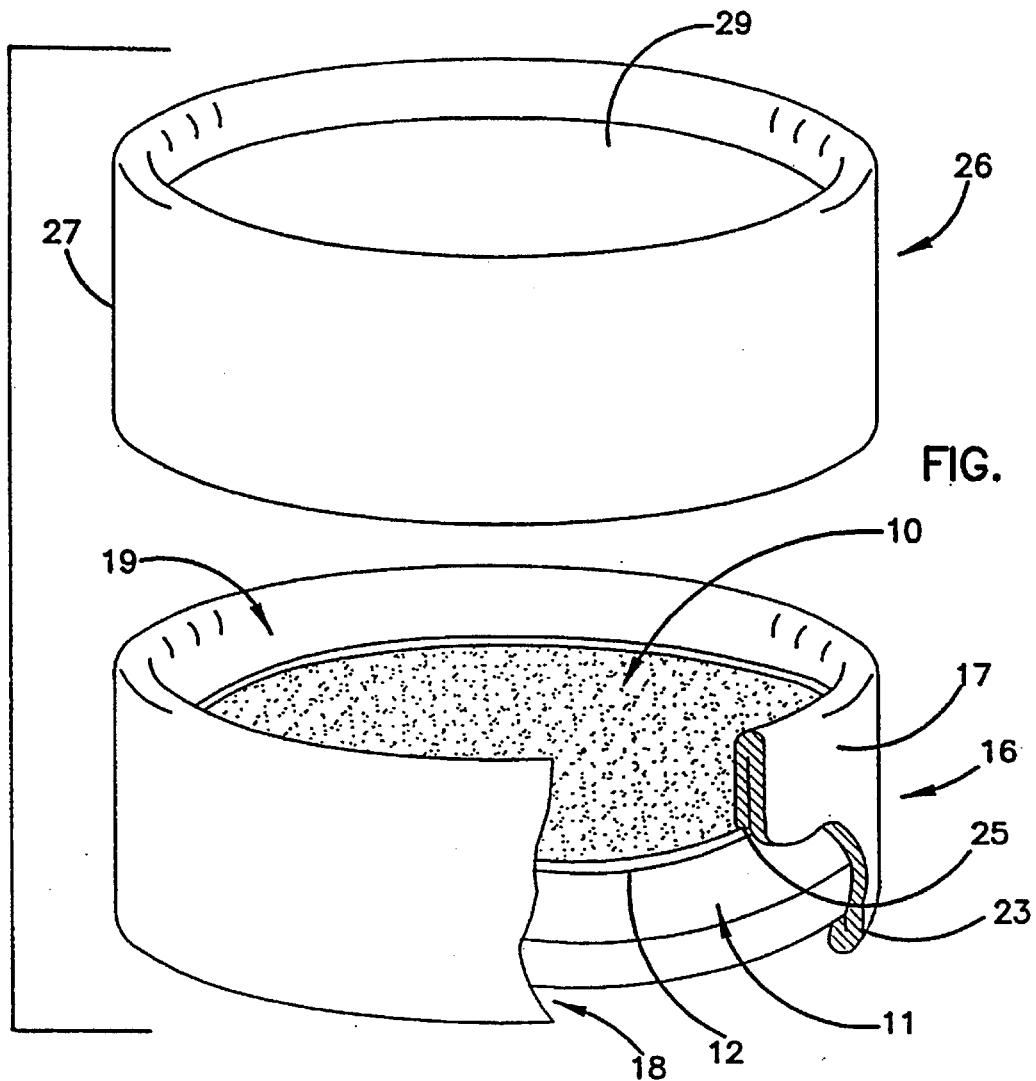
FIG. 1 is an exploded perspective view of a container including a base member and a lid, with part of the base being broken away.
Figure 2:
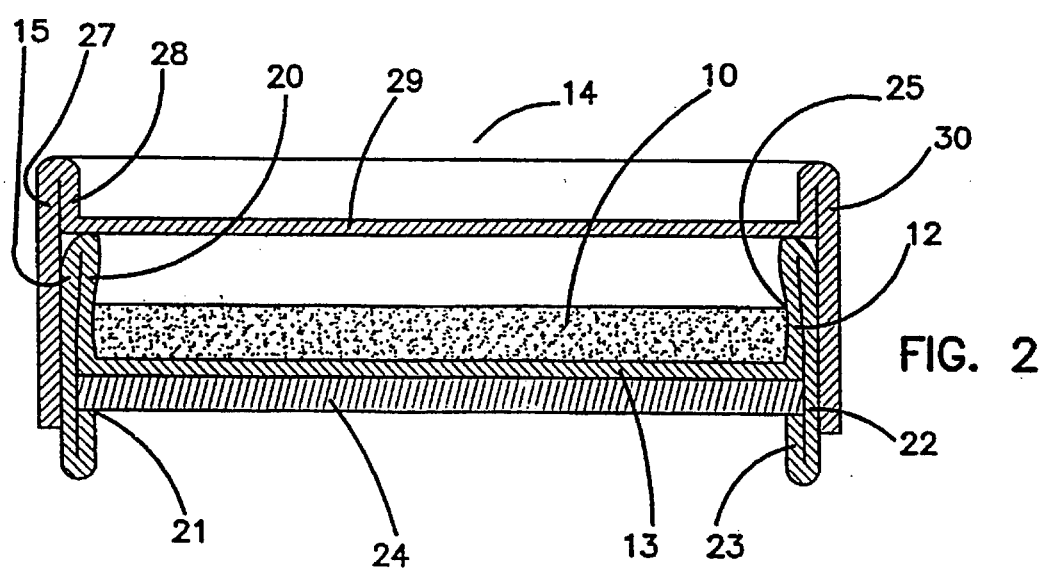
FIG. 2 is a cross-sectional view of the container showing the base and lid.

A container for a substantially solid cosmetic product such as shadow material in a compacted powder form 10 is contained in a receptacle 11. The receptacle 11 is formed with side wall 12 and a bottom 13. The powder product 10 is compacted in the receptacle 11 so that it provides a substantially flush surface 14, the surface 14 being substantially aligned with the top 15 of the side wall 12.

A base 16 for a container includes a selected peripheral side wall shaped 17 which is illustrated as substantially cylindrical. This defines a space for confining the solid product 10. The base 16 has open ends 18 and 19, respectively, and there is provided an interior rim 20 adjacent the top of the base 16 and rim 21 adjacent the bottom of the base 16. The rims 20 and 21 are formed by inwardly folding the outer walls 22 of the base 16 such as to form a ledge 23 on which an end panel 24 can fit in this engagement. A ridge 25 is located at the top of the base 16 for engaging the top 15 of the receptacle 11 for containing the solid product 10. In this manner, the receptacle 11 is sandwiched between the inner rims 20 and 21 of the base 16 of the container.

The material from which the base 16 is a fairly rigid cardboard or paper material formed as a tube and cut to a predetermined size. After the tube is cut, the ends are folded inwardly to form the interior rims 20 and 21.

The end panel 24 is similarly formed of a thickened semi-rigid cardboard material. Should the receptacle 11 not be in place, the end panel 24 would be a relatively loose fit between the rims 20 and 21. The end panel 24 may be located in position before both or one of the inner rims 20 or 21 are folded inwardly thereby facilitating location of the end panel 24 in position.

Alternatively, the interior rims 20 and 21 are formed and the panel 24 is then pushed into position. Similarly, the receptacle 11 could be located in position after one rim 21 is formed, the panel 24 and the receptacle 11 are in position. Thereafter the second rim 20 is formed thereby sandwiching the receptacle 11 in position. A rigid structure holds substantially solid product 10 in position.

A second component for the container is a lid 26. The lid 26 is formed with a peripheral side wall 27 conforming to and slightly larger than the side wall 17 for the base 16 thereby permitting for enclosing the base 16 with a sliding frictional fit.

The side wall 27 has open ends, and one end rim 28 of the side wall 27 is inwardly folded to form an interior rim at one open end of the lid. An end panel 29 is located and disposed adjacent to the edge 30 of the interior rim 28 in a substantially transverse location relative to the interior rim 28. The lid is for covering the base 16 of the container.

The end panel 29 can be a relative loose or frictional fit with the side wall 27. Preferably, a degree of friction is applied such that the end panel 29 is sized so that it cannot freely be removed from its location adjacent to the rim 28 when located in position on the lid. The lid material is formed of a semi-rigid cardboard or paper and is thus like the base 16 substantially non-deformable and rigid as assembled.

By having the container formed of bio-degradable cardboard material, there is provided a container which is environmentally benign and is a substantial advance in the art. Although the container has been described with reference to use with a cosmetic product which is substantially solid, the container so formed could have uses in other applications.

In different variations of the invention, the interior rims of the base and the lid may be formed in part by a partial deformation of the edges of the side walls of the base and/or lid. In other forms of the invention, an internal ring may be provided, the internal ring being a separate element formed to fit within the cylindrical interior of the base and lid. Deformation of the base or lid towards one or more of the ends may provide the effective interior rim.

Many more variations of the invention exist, each differing from others in matters of detail only. The invention is to be determined solely in terms of the following claims.

What is claimed is:

1. A container for cosmetics consisting essentially of:

a base comprising:

a cylinder having a side wall, an open first and an open second end defining an interior space;

a fold, into the interior space, in the side wall at the open first end;

an end panel, disposed in the interior space, abutting the fold in the side wall at the open first end;

a fold, into the interior space, in the side wall at the open second end;

a cosmetics substrate, disposed in the interior space, abutting the fold in the side wall at the open second end and the end panel; and a lid comprising:

a cylinder having a side wall, an open first and an open second end defining an interior space wherein the diameter of the interior space is dimensioned to slidably engage the base;

a fold, into the interior space, in the side wall at an open first end of the lid; and an end panel, disposed in the interior space, abutting the fold in the side wall at the open first end.

* * * * *